(12) United States Patent
Nakatani et al.

(10) Patent No.: US 11,503,809 B2
(45) Date of Patent: Nov. 22, 2022

(54) EXERCISE EQUIPMENT FOR SMALL ANIMALS

(71) Applicant: GEX CORPORATION, Osaka (JP)

(72) Inventors: Yasutomi Nakatani, Osaka (JP); Shunji Shiono, Osaka (JP); Takuji Oshima, Osaka (JP)

(73) Assignee: GEX CORPORATION, Osaka (JP)

( * ) Notice: Subject to any disclaimer, the term of this patent is extended or adjusted under 35 U.S.C. 154(b) by 57 days.

(21) Appl. No.: 16/959,235

(22) PCT Filed: Nov. 26, 2019

(86) PCT No.: PCT/JP2019/046080
§ 371 (c)(1),
(2) Date: Jun. 30, 2020

(87) PCT Pub. No.: WO2020/111034
PCT Pub. Date: Jun. 4, 2020

(65) Prior Publication Data
US 2020/0329674 A1    Oct. 22, 2020

(30) Foreign Application Priority Data
Nov. 30, 2018 (JP) .............................. JP2018-225150

(51) Int. Cl.
*A01K 15/02* (2006.01)
(52) U.S. Cl.
CPC ................................. *A01K 15/027* (2013.01)
(58) Field of Classification Search
CPC .... A01K 15/027; A01K 15/025; A01K 1/031; A01K 1/03
See application file for complete search history.

(56) References Cited

U.S. PATENT DOCUMENTS 9,901,076 B1 * 2/2018 Tucker .................. A01K 15/02
2003/0056735 A1 * 3/2003 Hull ....................... A01K 15/02
119/702
(Continued)

FOREIGN PATENT DOCUMENTS

| JP | 3820394 B | 7/2004 |
| JP | 2006288289 A | 10/2006 |

(Continued)

OTHER PUBLICATIONS

International Search Report and Written Opinion in PCT/JP2019/046080. dated Dec. 24, 2019. 7 pages.

(Continued)

*Primary Examiner* — Joshua J Michener
*Assistant Examiner* — Henry Hooper Mudd
(74) *Attorney, Agent, or Firm* — Meunier Carlin & Curfman LLC (57) ABSTRACT

An exercise tool for small animals includes a rotating wheel 1 having an opening 1 formed on a front side, a wall surface portion 15 formed on a back side, and a through hole 13 formed in the wall surface portion 15; a bearing holder 2 inserted into the through hole 13 from the back side; a bearing 3 attached to this bearing holder 2; a cap member 4 coupled to the bearing holder 2 from the front side for securing the bearing holder 2 to the wall surface portion 15 of the rotating wheel 1; and a shaft member 5 attached to a stand 100. The shaft member 5 has a shaft 52 formed thereon to be press-fit and coupled to the bearing 3.

13 Claims, 12 Drawing Sheets

(56) References Cited

U.S. PATENT DOCUMENTS

2008/0230012 A1* 9/2008 Woltmann ............. A01K 29/00
                                                            119/702
2011/0162586 A1* 7/2011 Ho ........................ A01K 15/02
                                                            119/704

FOREIGN PATENT DOCUMENTS

JP          3209016 U     3/2017
JP          6491781 B1    3/2019

OTHER PUBLICATIONS

Kaytee, "Super Pet Giant 12" Silent Spinner Wheel, Amazon.ca (2010).
Exotic Nutrition Pet Supply, "Silent Runner Wheel 12" Regular—Pet Exercise Wheel + Cage Attachment", Amazon.ca (2016).
Canadian Office Action issued on Sep. 29, 2021 in Canadian Application No. 3,087,440.

* cited by examiner

EXERCISE EQUIPMENT FOR SMALL ANIMALS

CROSS REFERENCE TO RELATED APPLICATIONS

This application claims priority to and is a United States National Phase Patent Application of International Patent Application Number PCT/JP2019/046080, filed on Nov. 26, 2019, which claims priority to JP Patent Application No. 2018-225150, filed on Nov. 30, 2018, both of which are incorporated by reference herein.

TECHNICAL FIELD

The present invention relates to an exercise tool for small animals, which has a rotating wheel and an attachment/support mechanism thereof.

BACKGROUND ART

Tools disclosed in Patent Documents 1 and 2 listed below are known as such an exercise tool for small animals. These exercise tools for small animals let a small animal (such as a hamster or a squirrel) on a rotating wheel turn the wheel as it runs, to solve the problem of the lack of exercise in the confined space of a pet cage.

The exercise tool for small animals disclosed in Patent Document 1 is configured such that, while a wheel-like main body (rotating wheel) is secured to a center axis of a rotating member that is a horizontal axis, the rotating member, which includes the center axis and a rotating member body having a larger diameter than the center axis, is encased in a bearing in an outer peripheral part thereof. This part of the rotating member encased in the bearing, as well as the bearing, are housed inside a holder outside the wheel-like main body, and this holder is secured to an inner face of a side wall of a container main body for keeping small animals.

The exercise tool for small animals disclosed in Patent Document 2 includes a wheel main body (rotating wheel) having a through hole in a wall on one side, a center axis structure attached to the wheel main body, and a fastening structure attached to the center axis structure such as to sandwich the wheel main body. The center axis structure includes a bearing and a center axis, the bearing being fit into a through hole of the wheel main body. The fastening structure includes a front cap and a back cap. The front cap is attached to a front end portion of the center axis, and the back cap is attached to a rear end portion of the center axis.

PRIOR ART DOCUMENTS

Patent Document

Patent Document 1: Japanese Patent No. 3820394
Patent Document 2: Japanese Registered Utility Model No. 3209016

SUMMARY OF THE INVENTION

Problems to be Solved by the Invention

The prior art of Patent Document 1 requires 7 components, as the tool includes the rotating member (rotating main body and bolt-like center axis), bearing, and holder (holder main body and lid member) other than the rotating wheel. The number of components is therefore large, which makes the component management and assembling cumbersome.

The tool according to Patent Document 2 uses fewer components than that of Patent Document 1, the tool including a fastening plate, a back cap, a front cap, and a bearing other than the rotating wheel. However, the fastening plate is formed with treads at both ends, which requires screw fastening at 2 locations, making the assembling tiresome in this regard. Further, the bearing being directly assembled in the rotating wheel is inconvenient for cleaning.

The present invention was made in view of the circumstances described above, its object being to provide an exercise tool for small animals that allows for a reduction in the number of components and improves the convenience of assembling and other activities.

Means for Solving the Problems

To solve the problems described above, an exercise tool for small animals according to the present invention includes: a rotating wheel including an opening formed on a front side, a wall surface portion formed on a back side, and a through hole formed in the wall surface portion;
a bearing holder inserted into the through hole from the back side;
a bearing attached to this bearing holder;
a cap member coupled to the bearing holder from the front side for securing the bearing holder to the wall surface portion of the rotating wheel; and
a shaft member attached to an attachment part,
the shaft member having a shaft formed thereon to be press-fit and coupled to the bearing.

The functions and effects of the exercise tool for small animals having such a structure will be explained. This tool is made up of a rotating wheel, a bearing holder, a bearing, a cap member, and a shaft member, i.e., the number of components is reduced to minimum. The bearing is not directly coupled to the rotating wheel, but fit into the bearing holder. The bearing holder and the cap member may be coupled together with a screw, but other coupling means may be used. Since the shaft formed on the shaft member is configured to be press-fit into the bearing, screw fastening during assembly is required for only one point, at a maximum. Since the shaft member can be attached to an attachment part after all the components have been coupled to the rotating wheel, the assembling activity is easy, and the disassembling/assembling convenience for cleaning is improved. Consequently, an exercise tool for small animals, which allows for a reduction in the number of components and improves the convenience of assembling and other activities, can be provided.

According to the present invention, preferably, the bearing holder is formed with a positioning protrusion to be fit into a positioning recess formed to the through hole of the rotating wheel.

This structure prevents the bearing holder from accidentally moving when the bearing holder is temporarily assembled to the rotating wheel, so that assembling is made easier.

According to the present invention, preferably, the cap member is formed with an abutment portion that makes contact with the wall surface portion of the rotating wheel, the abutment portion being formed with multiple projections that are able to make pressure contact with the wall surface portion.

This structure firmly secures the cap member to the rotating wheel, so that accidental loosening of the coupled cap member is prevented.

MODE FOR CARRYING OUT THE INVENTION

Figure 1:
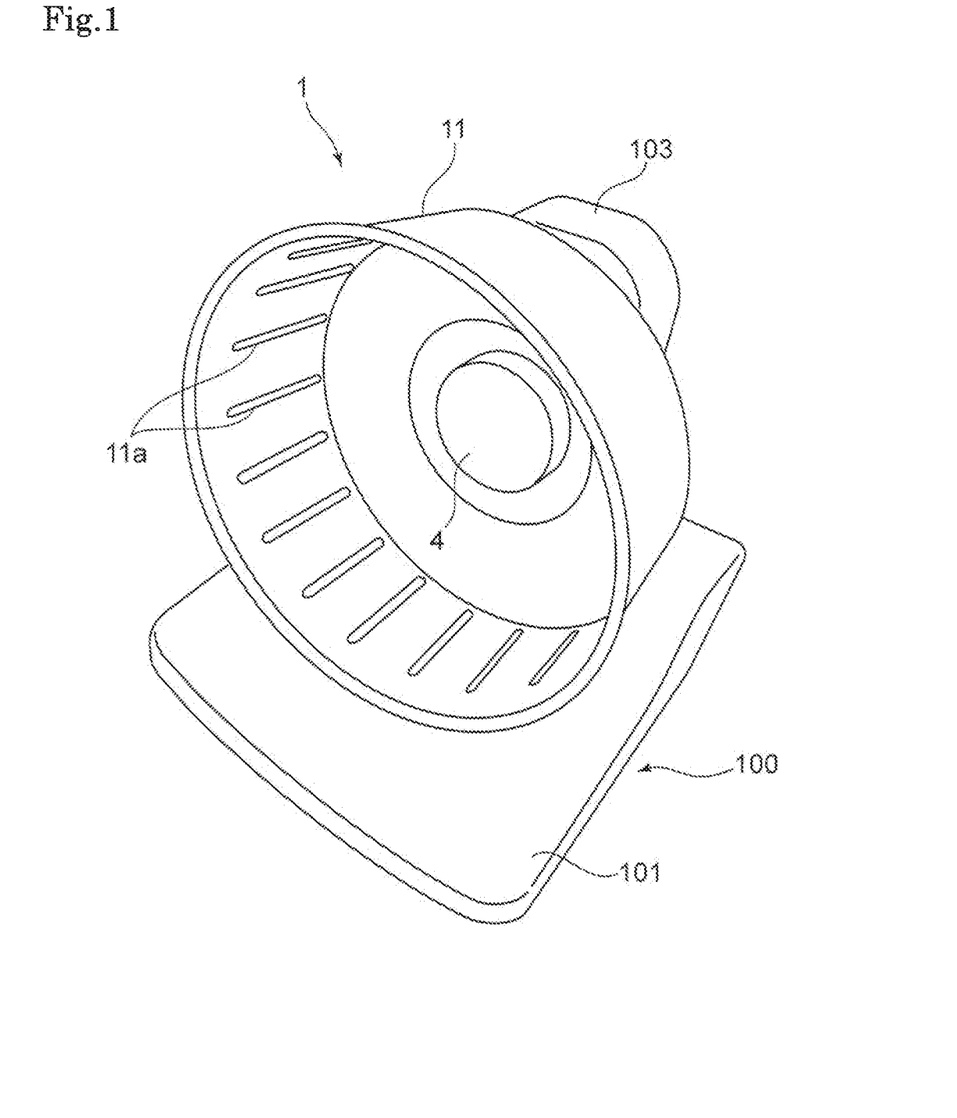
FIG. 1 is a perspective outer view of an exercise tool for small animals according to this embodiment attached to a stand as viewed from the front side.
Figure 2:
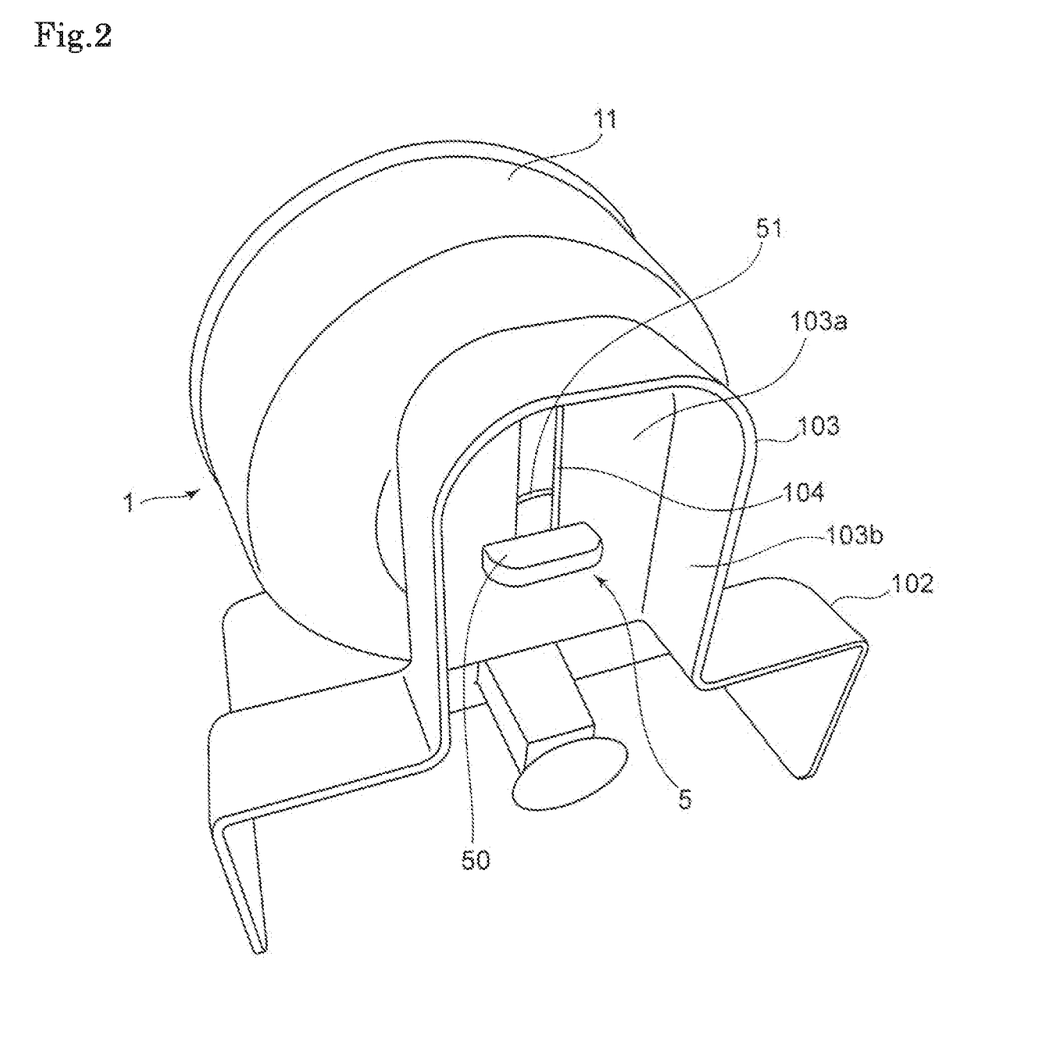
FIG. 2 is a perspective outer view of the exercise tool for small animals according to this embodiment attached to the stand as viewed from the back side.
Figure 3:
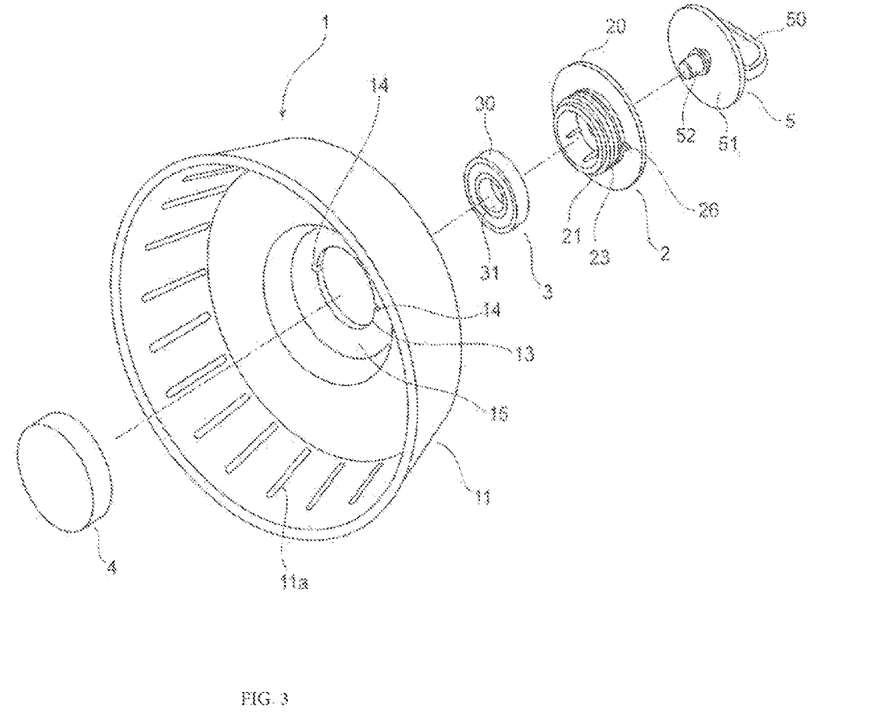
FIG. 3 is an exploded perspective of the exercise tool for small animals shown in FIG. 1.
Figure 4:
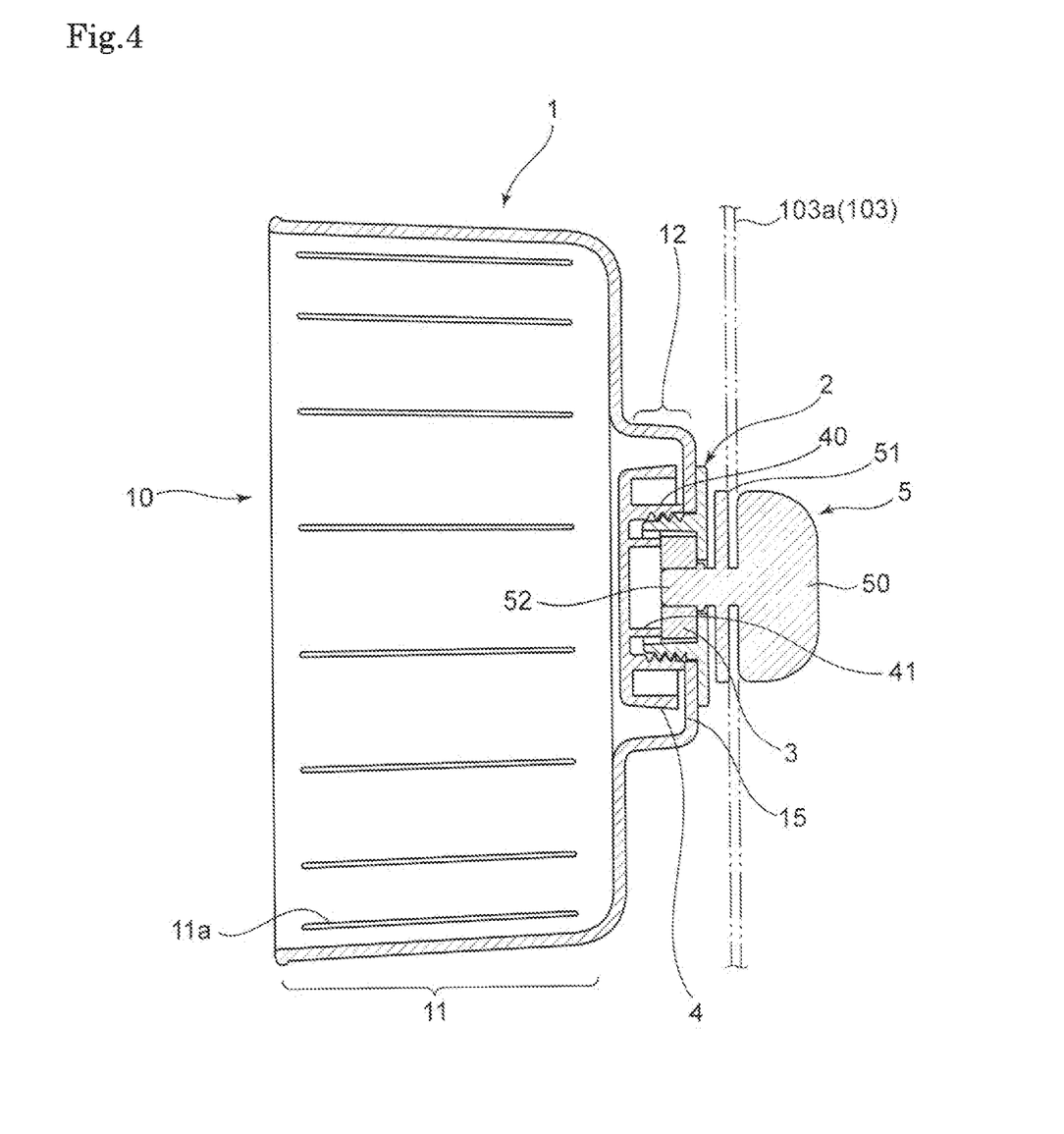
FIG. 4 is a longitudinal cross-sectional view of an assembled state of the exercise tool for small animals shown in FIG. 1.

A preferred embodiment of an exercise tool for small animals (hereinafter shortened to "exercise tool") according to the present invention will be described first. FIG. 1 is a perspective outer view of the exercise tool attached to a stand (corresponding to an attachment body) as viewed from the front side. FIG. 2 is a perspective outer view of the same as viewed from the back side. FIG. 3 is an exploded perspective of the exercise tool. FIG. 4 is a longitudinal cross-sectional view of an assembled state of the exercise tool. FIG. 5 to FIG. 12 are diagrams separately illustrating various components.

<Structure of Exercise Tool>

A stand 100 is set inside a cage for keeping a small animal. The stand 100 includes a placement part 101, an upright part 102, and an attachment part 103 integrally made of resin. The attachment part 103 protrudes upward in the middle of the upright part 102 and is formed with a vertical slit (long hole) 104. This slit 104 can be used to adjust the attachment height of the exercise tool when the tool is attached. The attachment part 103 includes a front wall surface 103a where the slit 104 is formed, and side wall surfaces 103b on both left and right sides.

As shown in the exploded perspective view of FIG. 3, the exercise tool includes a rotating wheel 1, a bearing holder 2, a bearing 3, a cap member 4, and a shaft member 5. The rotating wheel 1 has an opening 10 formed on the front side, to allow the small animal to enter into the rotating wheel 1 through this opening 10. For convenience of explanation, the left side in FIG. 4 from which the small animal enters is defined as the front side, and the right side as the back side.

The rotating wheel 1 has a large-diameter part 11 and a small-diameter part 12 integrally made of, for example, a transparent resin. The diameter of the large-diameter part 11 increases gradually toward the opening 10. A large number of linear protrusions 11a are formed along the circumferential direction on the inner wall surface of the large-diameter part 11. The small-diameter part 12 is formed as a recess when viewed from the front side, providing a space for accommodating the cap member 4 and others. The depth of the recess and the height of the cap member 4 are set such that the cap member 4 does not pop out of the recess. Namely, it is ensured that components such as the cap member 4 do not hinder the small animal when the animal exercises by rotating the rotating wheel 1.

Figure 5:
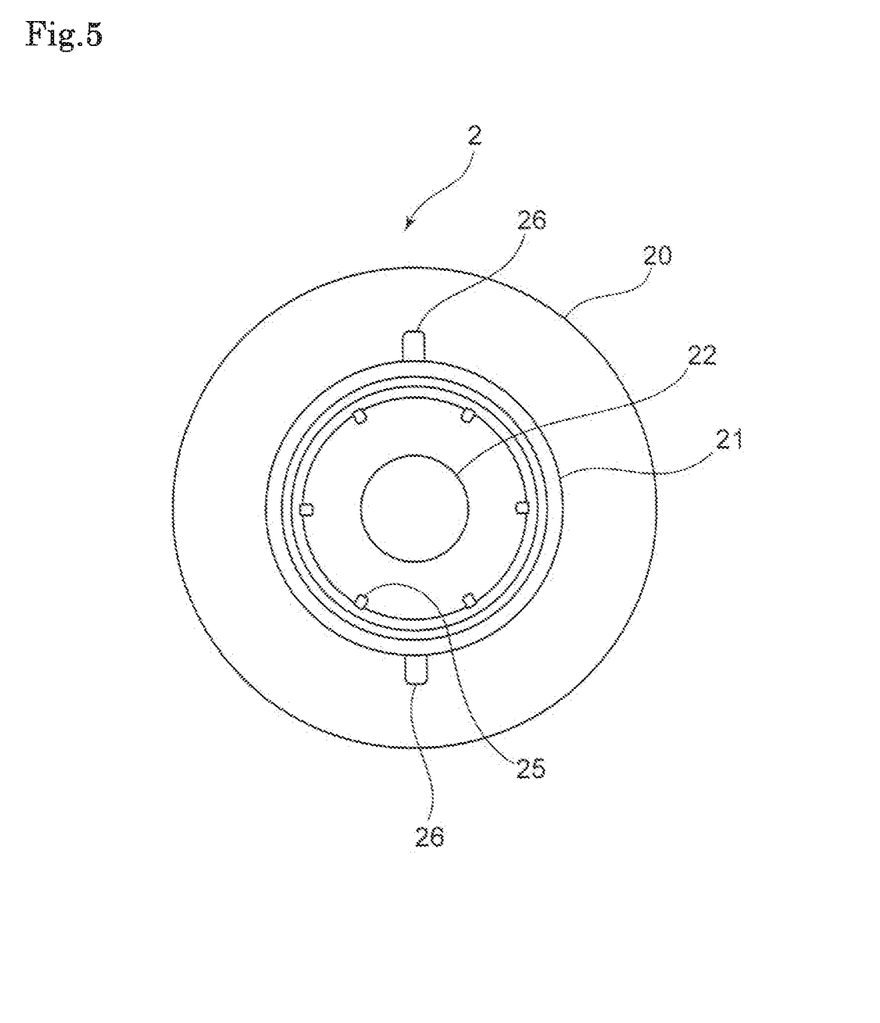
FIG. 5 is a view (plan view) of a bearing holder as viewed from the front side.
Figure 6:
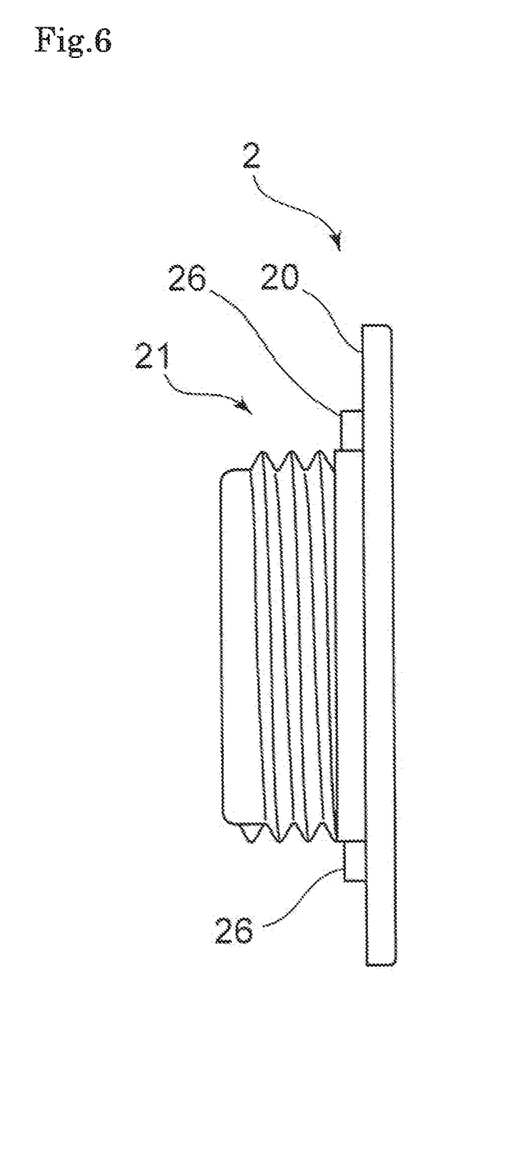
FIG. 6 is a side view of the bearing holder.
Figure 7:
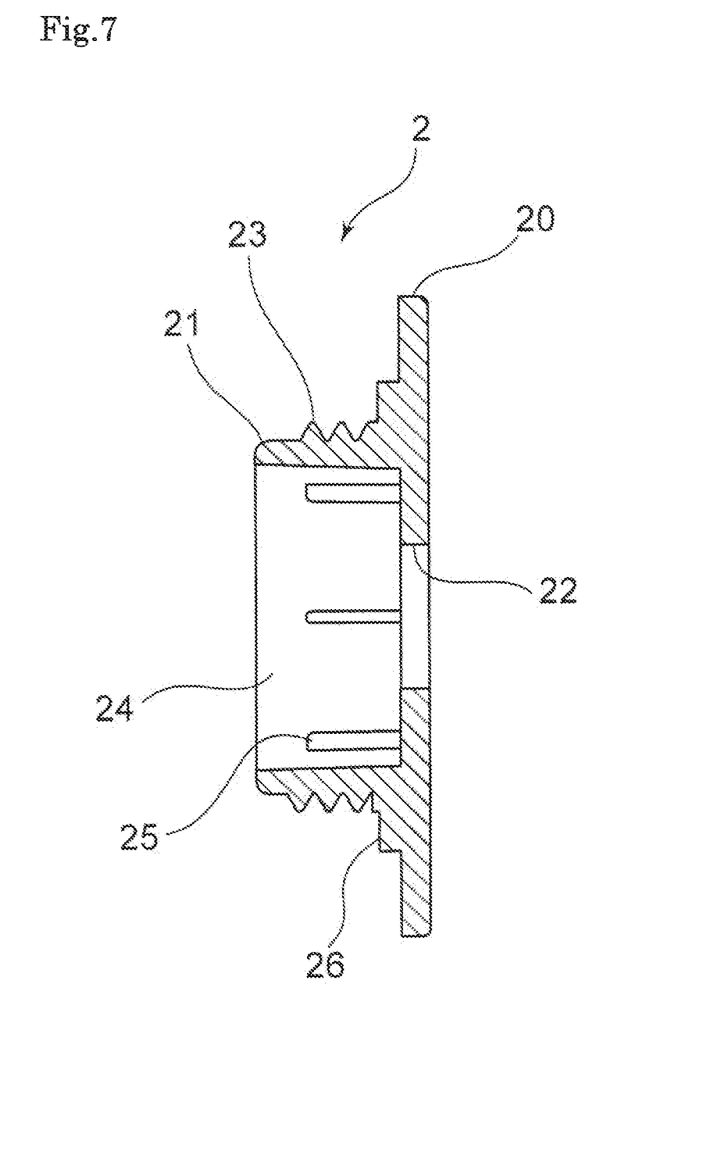
FIG. 7 is a cross-sectional view of the bearing holder.
Figure 8:
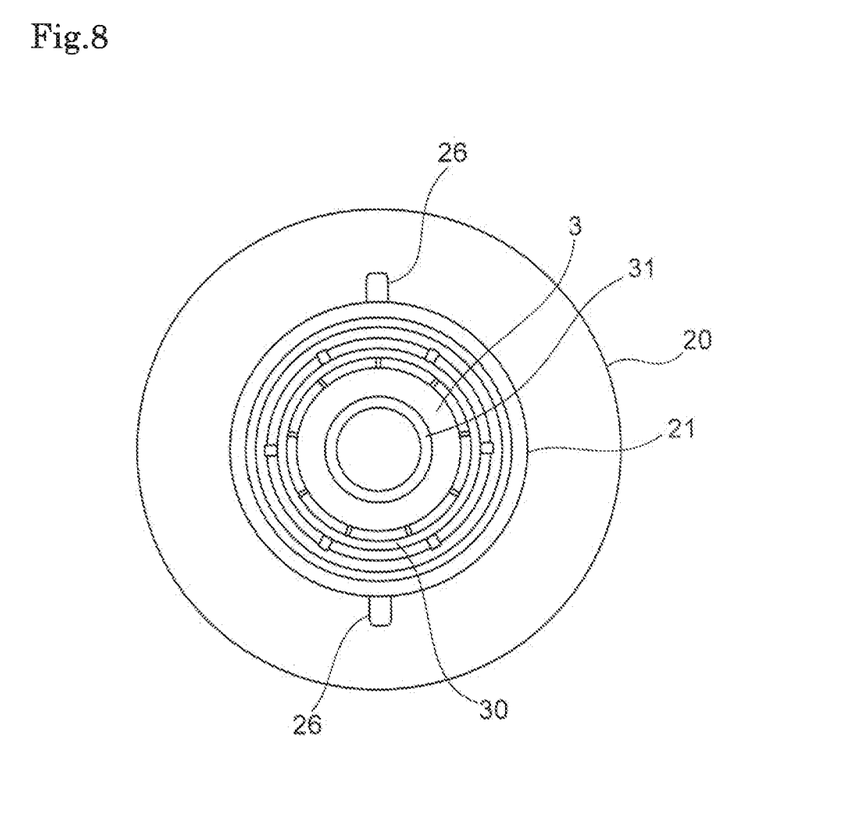
FIG. 8 is a plan view of the bearing holder with a bearing assembled thereto.

FIG. 5 is a view (plan view) of the bearing holder 2 as viewed from the front side. FIG. 6 is a side view of the same, and FIG. 7 is a cross-sectional view of the same. FIG. 8 is a view of the bearing holder as viewed from the front side with a bearing assembled thereto.

As shown also in FIG. 4, the bearing holder 2 is assembled from the back side (right side in FIG. 4) of the rotating wheel 1. The bearing holder 2 includes a first flat portion 20 and a cylindrical portion 21 integrally made of resin. The first flat portion 20 is in a circular plate shape. A through hole 22 is formed in the middle of the first flat portion 20, for a shaft 52 of the shaft member 5 to be described later to pass through.

External threads 23 are formed on an outer peripheral surface of the cylindrical portion 21. The inside of the cylindrical portion 21 is a housing part 24 for attaching the bearing 3. Protrusions 25 are formed at 6 locations on the inner wall surface of the housing part 24. The protrusions 25 have a predetermined length along the axial direction. When the bearing 3 is inserted, the outer race 30 of the bearing 3 makes pressure contact with the protrusions 25, i.e., the bearing 3 is secured by a press-fit into the housing part 24. The number, shape, and protruding amount of the protrusions 25 can be determined as desired in consideration of the ease of the press-fitting and the attachment strength.

The bearing 3 is a ball bearing, for example, and made up of the outer race 30, an inner race 31, and a large number of balls (not shown) set between the races. A common bearing can be used as the bearing 3. The inner race 31 of the bearing 3 is designed to have an inside diameter slightly smaller than the inside diameter of the through hole 22.

Positioning protrusions 26 are formed on an outer circumferential surface of the cylindrical portion 21 of the bearing holder 2 at two positions on the first flat portion 20 in 180° symmetry. Correspondingly, as shown in FIG. 1, a through hole 13 is formed in the small-diameter part 12 of the rotating wheel 1, and positioning recesses 14 are formed at 2 locations of this through hole 13 for the positioning protrusions 26 to fit in. This prevents accidental rotation of the bearing holder 2 when the bearing holder 2 is assembled to the rotating wheel 1 so that the bearing holder can be coupled to the rotating wheel in a stable manner.

Figure 11:
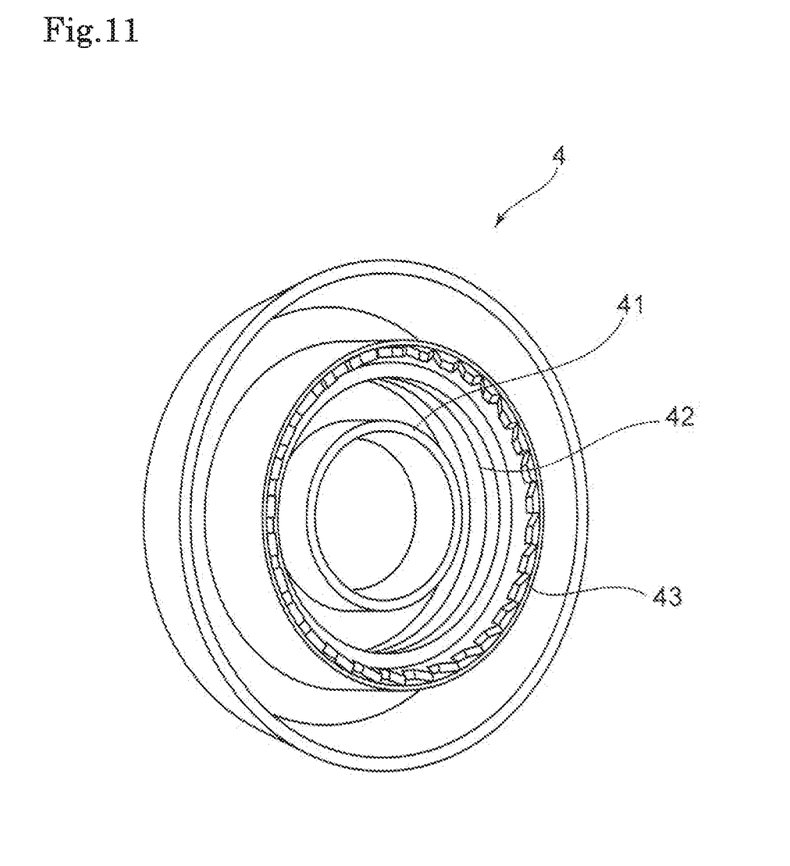
FIG. 11 is a perspective outer view of a cap member.
Figure 12:
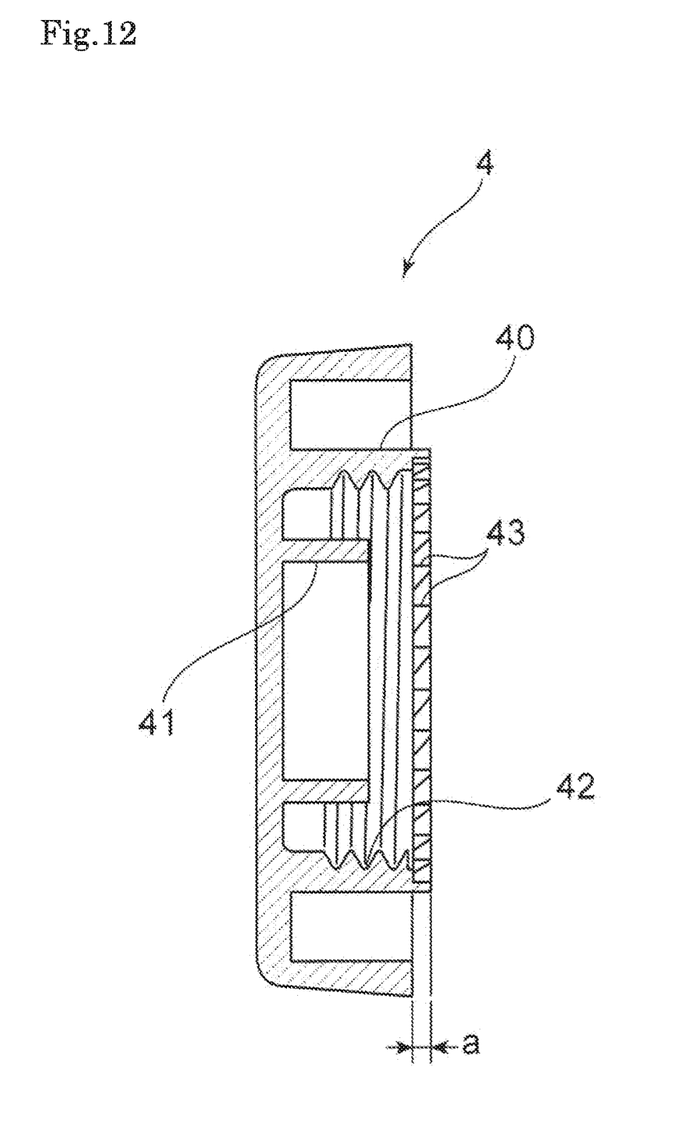
FIG. 12 is a cross-sectional view of the cap member.

FIG. 11 is a perspective outer view of the cap member 4. FIG. 12 is a cross-sectional outer view of the cap member 4. The cap member 4 is used for securing the bearing holder 2 to the rotating wheel 1. The cap member 4 includes a first cylindrical portion 40 and a second cylindrical portion 41 that are integrally formed, the first cylindrical portion 40 having a larger diameter than that of the second cylindrical portion 41. Internal threads 42 are formed on an inner surface of the first cylindrical portion 40, and the external threads 42 engage with the external threads 23 of the bearing holder 2.

A large number of projections 43 (abutment portion) are formed along the circumferential end face at the distal end of the first cylindrical portion 40. These projections 43 can be brought into contact with the wall surface portion 15 (see FIG. 1 and FIG. 4) of the small-diameter part 12 of the rotating wheel 1. This way, the bearing holder 2 and the cap member 4 can be firmly coupled to the rotating wheel 1. Since the distal end of the first cylindrical portion 40 protrudes from an outermost circumferential tip of the cap member 4 by a length a (see FIG. 12), the cylindrical portion can reliably bring the projections 43 into contact with the wall surface portion 15. While the projections 43 in this embodiment are substantially triangular, the shape is not limited to such a shape. The number of projections 43 to be arranged can also be determined as desired.

The distal end of the second cylindrical portion 41 can be brought into contact with a surface of the bearing 3 as shown also in FIG. 4, so that an accidental axial displacement of the bearing 3 can be prevented.

Figure 9:
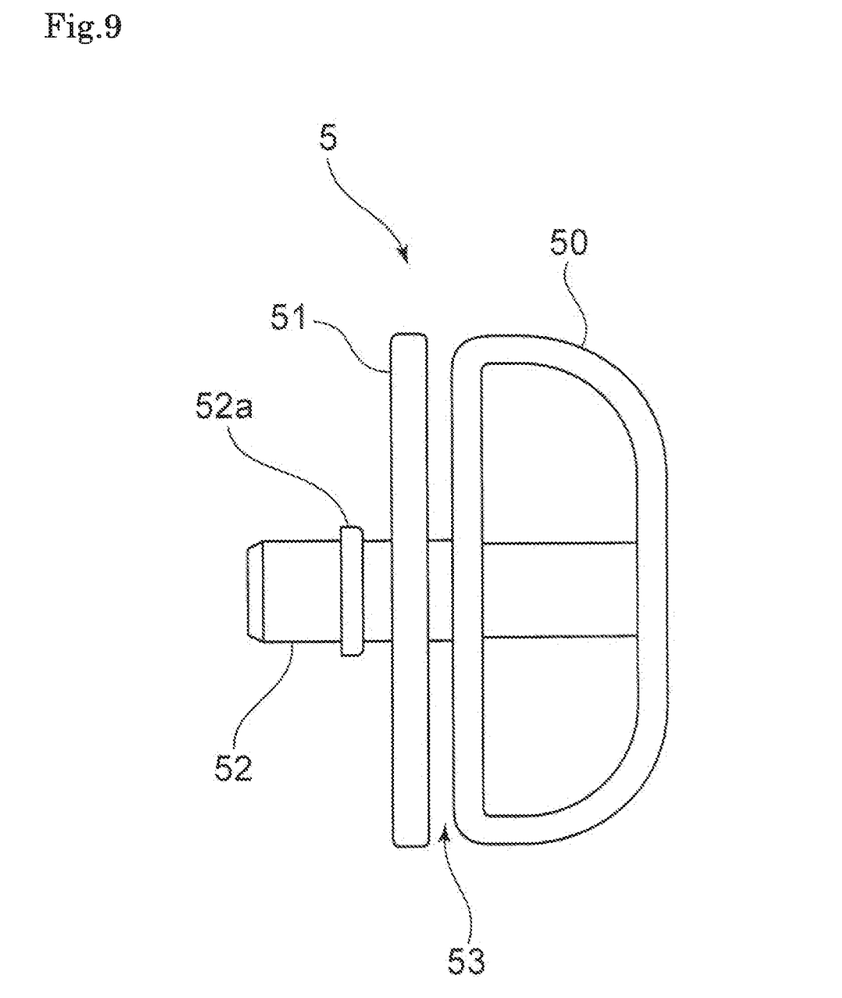
FIG. 9 is a side view of a shaft member.
Figure 10:
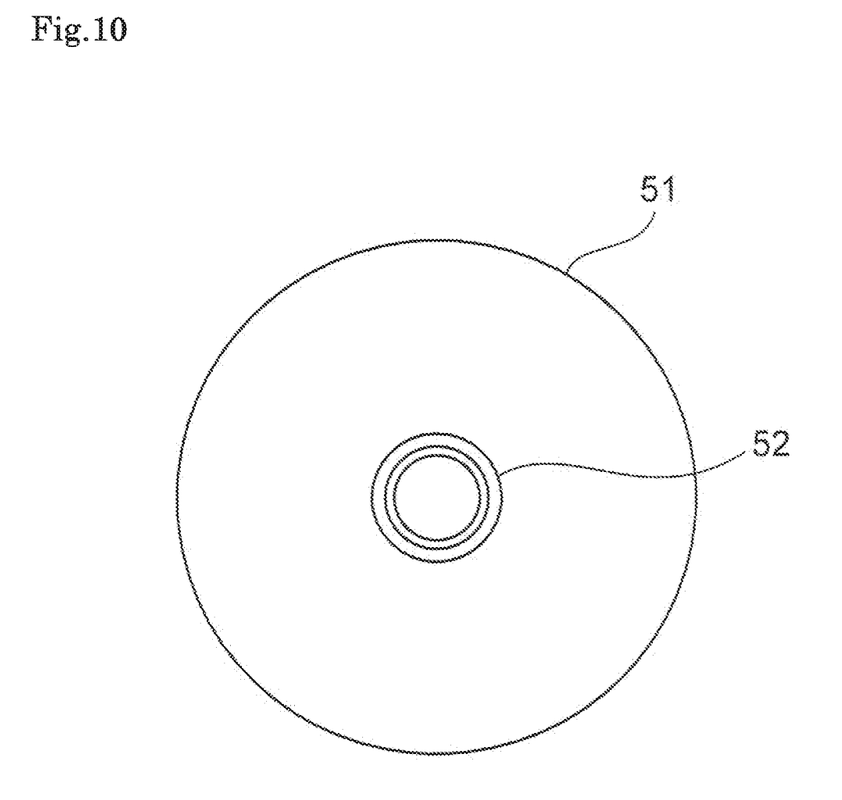
FIG. 10 is a plan view of the shaft member as viewed from the front side.

FIG. 9 is a side view of the shaft member 5, and FIG. 10 is a plan view of the same as viewed from the front side. The shaft member 5 includes a knob portion 50, a second flat portion 51, and a shaft 52 integrally made of resin. There is a gap 53 provided between the knob portion 50 and the second flat portion 51.

The knob portion 50 has an elongated shape so that it can readily be pinched with fingers. The second flat portion 51 is formed in a circular plate-like shape. The size of the gap 53 is set to be slightly smaller than the thickness of the front wall surface 103a. Thus the knob portion 51 can be retained on the front wall surface 103a by a frictional force.

The shaft 52 is press-fit into the inner race 31 of the bearing 30. The shaft 52 includes a large-diameter part 52a midway thereof, this large-diameter part 52a being designed to be slightly larger than the inside diameter of the inner race 31. This determines the insertion position of the shaft 52 into the bearing 3.

<Assembling Steps>

Next, the assembling steps of the exercise tool will be described. First, the bearing 3 is press-fit into the housing part 24 of the bearing holder 2. Next, the shaft 52 of the shaft member 5 is press-fit into the inner race 31 of the bearing 3. The bearing holder 2, to which these bearing 3 and shaft member 5 have been assembled, is inserted into the through hole 13 of the rotating wheel 1 from the back side. When inserting the bearing holder, the positioning protrusions 26 formed on the bearing holder 2 are aligned with the positioning recesses 14 formed to the through hole 13. This way, the bearing holder 2 is inserted into the through hole 13 such that it cannot rotate.

Next, the cap member 4 is inserted from the front side of the rotating wheel 1 and coupled to the bearing holder 2. The external threads 23 formed on the bearing holder 2 are engaged with the internal threads 42 formed to the cap member 4 so that they are coupled together. When firmly screwed together, the projections 43 formed on the cap member 4 make contact with the wall surface portion 15 of the rotating wheel 1, generating a frictional force that fastens the cap member 4 so that it does not loosen. With the completion of the coupling of the bearing holder 2 and the cap member 4, the assembling of the exercise tool is complete. When assembling is complete, the second flat portion 51 of the shaft member 5 and the first flat portion 20 of the bearing holder 2 are kept slightly distanced from each other. Therefore, the rotating wheel 1 is able to rotate smoothly.

The shaft member 5 of the exercise tool assembled as described above is coupled to the front wall surface 103a of the stand 100. Specifically, the knob portion 50 is inserted from the front side of the slit 104. The knob portion 50 can be inserted into the slit 104 by aligning the longitudinal direction of the knob portion 50 with the longitudinal direction of the slit 104. By rotating the knob portion 50 ninety degrees after that, the shaft member 5 is retained by the frictional force, with the front wall surface 103a being positioned in the gap 53 formed between the knob portion 50 and the second flat portion 51. Since the shaft member 5 can move up and down in the slit 4, the shaft member 5 can be retained at any desirable position.

According to the structure of the present invention, the rotating wheel 1 is separable from the cap member 4 and the bearing holder 2 so that it is convenient when cleaning. Also, the exercise tool is made up of a minimum number of components, i.e., five components, which are the rotating wheel 1, bearing holder 2, bearing 3, cap member 4, and shaft member 5. Moreover, since the exercise tool allows itself to be attached to the stand 100 with all the components assembled together, the assembling efficiency is improved. The assembling steps are not necessarily limited to those described above.

Other Embodiments

While the stand 100 set in the cage is shown as an example of an attachment body in this embodiment, the present invention is not limited to this example. For example, the exercise tool may be directly attached to a side face of a wire cage. Alternatively, the exercise tool may be attached to a rotating wheel holder that comes with the cage, and this may be attached to the cage. The stand 100 and the holder itself may come in various structures and the present invention should not be limited to particular types of structures.

The relationship between the positioning recesses 14 and the positioning protrusions 26 may be reversed.

DESCRIPTION OF REFERENCE SIGNS

1 Rotating wheel
10 Opening
11 Large-diameter part
12 Small-diameter part
13 Through hole
14 Positioning recess
15 Wall surface portion
2 Bearing holder
20 First flat portion
21 Cylindrical portion
22 Through hole
23 External thread
24 Housing part
25 Protrusion
26 Positioning protrusion
3 Bearing
30 Outer race
31 Inner race
4 Cap member
40 First cylindrical portion
41 Second cylindrical portion
42 Internal thread
43 Protrusion
5 Shaft member
50 Knob portion
51 Second flat portion
52 Shaft
53 Gap
100 Stand
103 Attachment part
103a Front wall surface
104 Slit

The invention claimed is:

1. An exercise tool for small animals, comprising:
   a rotating wheel including an opening formed on a front side, a wall surface portion formed on a back side, and a through hole formed in the wall surface portion;
   a bearing holder inserted into the through hole from the back side;
   a bearing attached to this bearing holder;
   a cap member coupled to the bearing holder from the front side for securing the bearing holder to the wall surface portion of the rotating wheel; and
   a shaft member attached to an attachment part,
   the shaft member having a shaft formed thereon to be press-fit and coupled to the bearing; and
   the bearing holder further comprising at least one protrusion having a predetermined length in an axial direction and sized to make pressure contact with an outer race of the bearing.

2. The exercise tool for small animals according to claim 1, wherein the bearing holder is formed with a positioning protrusion to be fit into a positioning recess formed to the through hole of the rotating wheel.

3. The exercise tool for small animals according to claim 1, wherein the cap member is formed with an abutment portion that makes contact with the wall surface portion of the rotating wheel, the abutment portion being formed with multiple projections that are able to make pressure contact with the wall surface portion.

4. The exercise tool for small animals according to claim 1, the shaft member further comprising a knob portion opposite the shaft.

5. The exercise tool for small animals according to claim 4, wherein the shaft and the knob portion are a single integral piece.

6. The exercise tool for small animals according to claim 5, wherein the single integral piece comprises a resin.

7. The exercise tool for small animals according to claim 4, wherein the shaft comprises a first diameter portion at an end of the shaft and a second diameter portion between the end of the shaft and the knob portion, the second diameter portion having a diameter greater than the first diameter portion, wherein the diameter of the second diameter portion is greater than a diameter of an inner race of the bearing.

8. The exercise tool for small animals according to claim 7, wherein the second diameter is sized to fit within a through hole of the bearing holder.

9. The exercise tool for small animals according to claim 1, wherein the cap member further comprising internal threads on an inner cylindrical surface thereof, the internal threads complementary to the external threads of the bearing holder.

10. The exercise tool for small animals according to claim 1, wherein the rotating wheel comprises a large-diameter part and a small-diameter part, the small-diameter part on a side of the rotating wheel opposite the opening.

11. The exercise tool for small animals according to claim 10, wherein the cap member has a diameter and height sized to fit within the small-diameter part of the rotating wheel.

12. The exercise tool for small animals according to claim 1, the cap member comprising a first cylindrical portion and a second cylindrical portion, the first cylindrical portion having a diameter larger than a diameter of the second cylindrical portion, and internal threads on an inner surface of the first cylindrical portion.

13. The exercise tool for small animals according to claim 12, further comprising a plurality of protrusions along a circumferential end face at a distal end of the first cylindrical portion of the cap member for contacting the wall surface portion of the rotating wheel.

* * * * *